(12) United States Patent
Ogawa (10) Patent No.: US 11,193,787 B2
(45) Date of Patent: Dec. 7, 2021

(54) GRAPH GENERATING DEVICE

(71) Applicant: Furuno Electric Co., Ltd., Nishinomiya (JP)

(72) Inventor: Kenta Ogawa, Amagasaki (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 265 days.

(21) Appl. No.: 16/507,550

(22) Filed: Jul. 10, 2019

(65) Prior Publication Data

US 2020/0018615 A1    Jan. 16, 2020

(30) Foreign Application Priority Data

Jul. 10, 2018    (JP) .............................. JP2018-130522

(51) Int. Cl.
 *G01C 21/36*    (2006.01)
 *G01C 21/34*    (2006.01)
 *G06T 11/20*    (2006.01)

(52) U.S. Cl.
 CPC ..... *G01C 21/3676* (2013.01); *G01C 21/3453* (2013.01); *G06T 11/203* (2013.01)

(58) Field of Classification Search
 CPC ........................ G01C 21/3676; G01C 21/3453; G01C 21/32; G01C 21/3841; G01C 21/3848;
 (Continued)

(56) References Cited

U.S. PATENT DOCUMENTS 8,115,764 B2 *  2/2012  Kameda ............. G01C 21/3638
                                                     345/420
8,744,770 B2 *  6/2014  Samet ................... G06Q 10/047
                                                      701/540
(Continued)

FOREIGN PATENT DOCUMENTS

CN    106528773 A    3/2017
CN    107228673 A    10/2017
JP    7-129238 A    5/1995

OTHER PUBLICATIONS

Shojaeipour et al: "Motion planning for mobile robot navigation using combine Quad-Tree Decomposition and Voronoi Diagrams", Computer and Automation Engineering (ICCAE), 2010 The 2nd International Conference on, IEEE, Piscataway, NJ, USA, Feb. 26, 2010 (Feb. 26, 2010), pp. 90-93, XP031671732. (Year: 2010).*

(Continued)

*Primary Examiner* — Luis A Martinez Borrero
(74) *Attorney, Agent, or Firm* — Xsensus LLP (57) ABSTRACT

A graph generating device is provided, which may include an interface (an obstacle data acquiring module) and processing circuitry (a first graph generating module, a second graph generating module, and a graph synthesizing module). The interface (the obstacle data acquiring module) may acquire obstacle data including information on an obstacle. The processing circuitry is configured to generate a first graph having an area including the obstacle that is recursively divided with a quadtree splitting method into cells that are exclusive of the obstacle, the first graph has a first vertex set in each cell and adjacent first vertexes being interconnected, to generate a second graph that includes second vertexes interconnected by a different method from the quadtree splitting method, and to generate a combined graph from the first graph and the second graph.

7 Claims, 7 Drawing Sheets

(58) Field of Classification Search
CPC .. G06T 11/203; H04N 19/176; H04N 19/119; H04N 19/159
See application file for complete search history.

(56) References Cited

U.S. PATENT DOCUMENTS

| | | | | |
|---|---|---|---|---|
| 9,524,647 | B2* | 12/2016 | Kohn-Rich | G01C 21/20 |
| 9,591,335 | B2* | 3/2017 | Kirchhoffer | H04N 19/46 |
| 9,796,390 | B2* | 10/2017 | Halder | G06K 9/00791 |
| 9,807,427 | B2* | 10/2017 | Helle | H04N 19/439 |
| 10,134,152 | B2* | 11/2018 | Mottin | G06T 7/70 |
| 10,325,169 | B2* | 6/2019 | Bar-Nahum | G06T 7/248 |
| 10,347,139 | B2* | 7/2019 | Kohn-Rich | G05D 1/0646 |
| 10,452,788 | B2* | 10/2019 | Schmidt | G06F 30/20 |
| 10,681,388 | B2* | 6/2020 | Covell | H04N 19/176 |
| 10,788,325 | B1* | 9/2020 | Lenhardt | G08G 5/0021 |
| 2003/0001836 | A1* | 1/2003 | Ernst | G06T 17/005 345/419 |
| 2005/0035883 | A1* | 2/2005 | Kameda | G06T 17/005 340/995.1 |
| 2005/0149251 | A1* | 7/2005 | Donath | G01C 21/26 701/532 |
| 2006/0023917 | A1* | 2/2006 | Dickmann | G01S 17/66 382/104 |
| 2006/0184294 | A1* | 8/2006 | Ma | G01C 21/00 701/25 |
| 2009/0088916 | A1* | 4/2009 | Elgersma | G05D 1/106 701/23 |
| 2015/0003683 | A1* | 1/2015 | Grewe | G06K 9/00624 382/104 |
| 2015/0353083 | A1* | 12/2015 | Hasberg | G06T 11/203 701/1 |
| 2016/0210863 | A1* | 7/2016 | Kohn-Rich | G08G 5/0086 |
| 2017/0247036 | A1* | 8/2017 | Halder | G06T 15/20 |
| 2017/0352163 | A1* | 12/2017 | Mottin | G06K 9/00805 |
| 2018/0101744 | A1* | 4/2018 | Bar-Nahum | G06K 9/0063 |
| 2018/0114449 | A1* | 4/2018 | Kohn-Rich | G01C 21/20 |
| 2019/0086513 | A1* | 3/2019 | Lipson | G01S 17/931 |
| 2019/0122073 | A1* | 4/2019 | Ozdemir | A61B 6/5217 |
| 2019/0362173 | A1* | 11/2019 | Bar-Nahum | G06K 9/2054 |
| 2020/0018601 | A1* | 1/2020 | Yamabayashi | B63B 49/00 |
| 2020/0158517 | A1* | 5/2020 | Tadi | G01C 21/32 |
| 2020/0304827 | A1* | 9/2020 | Abe | H04N 19/513 |

OTHER PUBLICATIONS

Shojaeipour et al: "Motion planning for mobile robot navigation using combine Quad-Tree Decomposition and Voronoi Diagrams", Computer and Automation Engineering (ICCAE), 2010 The 2nd International Conference on, IEEE, Piscataway, NJ, USA, Feb. 26, 2010 (Feb. 26, 2010), pp. 90-93, XP031671732, ISBN: 978-1-4244-55.*

Extended European Search Report dated Dec. 11, 2019, issued in corresponding European Application No. 19185148.4, 10 pages.

Shojaeipour et al, Motion Planning for Mobile Robot Navigation Using Combine Quad-Tree Decomposition and Voronoi Diagrams, Computer and Automation Engineering (ICCAE), 2010 The 2nd International Conference, IEEE, Feb. 26, 2010 pp. 90-93, XP031671732.

* cited by examiner

GRAPH GENERATING DEVICE

CROSS-REFERENCE TO RELATED APPLICATION(S)

This application claims priority under 35 U.S.C. § 119 to Japanese Patent Application No. 2018-130522, which was filed on Jul. 10, 2018, the entire disclosure of which is hereby incorporated by reference.

TECHNICAL FIELD

The present disclosure relates to a graph generating device.

BACKGROUND

Conventionally, methods of searching for a route using, for example, map data are known. JP1995-129238A discloses this kind of route finding method.

JP1995-129238A discloses a method of searching for the travelable route by expressing environment by a quadtree structure in which the environment is subdivided into four rectangular areas. If an obstacle exists in the subdivided rectangular area, the area is recursively subdivided into four rectangular areas.

However, the configuration of JP1995-129238A cannot search for a route passing through a narrow space, such as between obstacles, when the processing which recursively subdivides into four rectangular areas is performed few times. On the other hand, if the number of times of subdividing into four rectangular areas is increased in order to search for such a narrow route, since the amount of data of the quadtree structure increases explosively, the calculation load increases. Therefore, the configuration of JP1995-129238A has room for an improvement because a suitable route is unable to be searched for with light calculation load.

SUMMARY

The purpose of the present disclosure is to appropriately generate a graph for route finding.

According to a first aspect of the present disclosure, a graph generating device with the following configuration is provided. The graph generating device may include an obstacle data acquiring module (an interface), a first graph generating module, a second graph generating module, and a graph synthesizing module. The obstacle data acquiring module may acquire obstacle data including information on an obstacle. The first graph generating module may recursively subdivide an area including the obstacle into cells by a quadtree dividing method, set a first vertex in an exclusive cell that is each of the cells without the obstacle, and connect the first vertexes of the adjacent exclusive cells by a first side, to generate a first graph. The second graph generating module may set second vertexes by a different method from the quadtree dividing method and connect the second vertexes by a second side, to generate a second graph. The graph synthesizing module may generate a synthesized graph by synthesizing the first graph with the second graph.

Thus, the graph for route finding can be generated, which takes both the advantage of the quadtree dividing method, and the advantage of another method.

The first graph generating module may terminate the subdivision once performed a given upper limit number of times.

Thus, the number of subdividing a space performed by the quadtree dividing method is limited below a given number of times, resulting in achieving the reduction of a calculation load of the route calculation.

The second graph generating module may determine, in the area, which a surrounding area that is an area surrounding the obstacle an arbitrary point not included in the obstacle belongs by a Voronoi dividing method, sets a plurality of second vertexes along a boundary of the determined surrounding area, and generate the second graph by connecting the second vertexes with the second side.

Thus, the graph can be generated, which takes both the advantage of the quadtree dividing method by which a graph of a detour or longer route is not easily generated, and the advantage of the Voronoi dividing method by which the graph can be generated with a light load processing even in a location where the space between the obstacles is narrow.

The graph generating device may further include a second graph adjusting module configured to adjust the second graph generated by the second graph generating module, before being synthesized with the first graph by the graph synthesizing module.

Thus, the synthesized graph in which two graphs are naturally connected without giving a user uncomfortableness, can be generated.

The second graph adjusting module may delete the second side only passing through one or more of the exclusive cells.

Thus, for a part where the first graph and the second graph substantially overlap with each other, the two graphs can be synthesized by giving priority to the first graph generated by the quadtree dividing method.

When the cell partially including the obstacle is referred to as a partially inclusive cell, the second graph adjusting module may exclude the second side only passing through one or more of the partially inclusive cells from a deleting target.

Thus, the synthesized graph can be generated by using the second side passing the partially inclusive cell where the first side cannot be arranged in the first graph.

When a target second vertex that is one of two vertexes connected by the second side in the second graph is located in a partially inclusive cell and the second side passes through the exclusive cell as well as the partially inclusive cell, the graph synthesizing module may reconnect the second side to the target second vertex, and to the first vertex of the exclusive cell through which the second side first passes, when the second side originates from the target second vertex, the partially inclusive cell partially including the obstacle.

Thus, the second graph and the first graph can naturally be connected and synthesized.

According to a second aspect of the present disclosure, a method of generating a graph is provided. The method may include acquiring obstacle data including information on an obstacle, recursively subdividing an area including the obstacle into cells by a quadtree dividing method, setting a first vertex in an exclusive cell that is each of the cells without the obstacle, and connecting the first vertexes of the adjacent exclusive cells by a first side, to generate a first graph, setting second vertexes by a different method from the quadtree dividing method and connecting the second vertexes by a second side, to generate a second graph, and generating a synthesized graph by synthesizing the first graph with the second graph.

Thus, the route graph can be generated, which takes both the advantage of the quadtree dividing method, and the advantage of another method.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Figure 1:
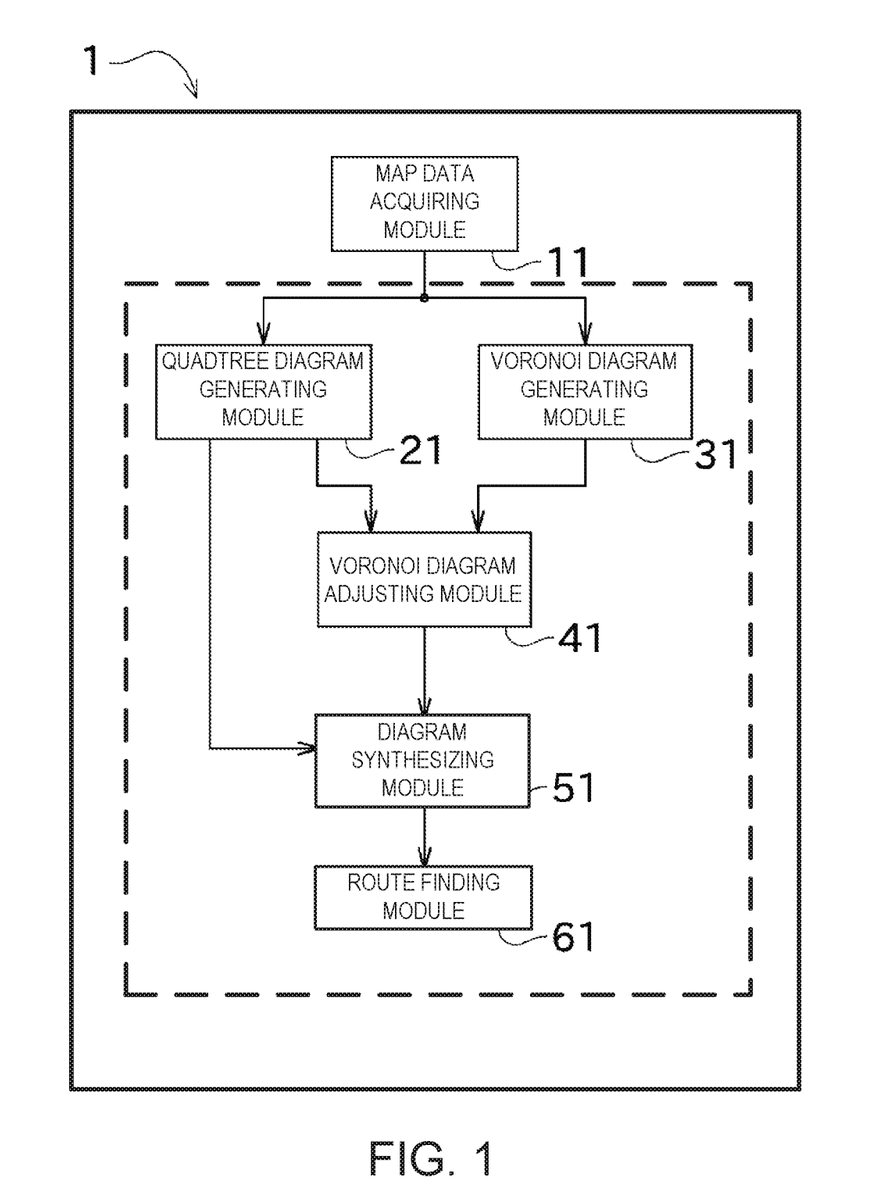
FIG. 1 is a block graph illustrating an electric configuration of a graph generating device according to one embodiment of the present disclosure.

Next, one embodiment of the present disclosure is described with reference to the accompanying drawings. FIG. 1 is a block graph illustrating an electric configuration of a graph generating device 1 according to one embodiment of the present disclosure.

The graph generating device 1 illustrated in FIG. 1 is capable of generating a graph which expresses one or more route to avoid an obstacle. The term "graph" as used herein may refer to a combination of a set of vertexes and a set of sides each of which connects two vertexes.

The graph generating device 1 may include a map data acquiring module 11 (obstacle data acquiring module, an interface), a quadtree graph generating module 21 (first graph generating module), a Voronoi graph generating module 31 (second graph generating module), a Voronoi graph adjusting module 41 (second graph adjusting nodule), a graph synthesizing module 51, and a route finding module 61. A quadtree graph generating module 21 (first graph generating module), a Voronoi graph generating module 31 (second graph generating module), a Voronoi graph adjusting module 41 (second graph adjusting module), a graph synthesizing module 51, and a route finding module 61 can be implemented on processing circuitry (in a dotted line rectangular of FIG. 1).

Specifically, the graph generating device 1 may be comprised of a known computer, and include a CPU, a ROM, a RAM, and a HDD. A program for implementing a method of generating the graph of the present disclosure may be stored in the HDD. By collaboration of the hardware and the software described above, the graph generating device 1 may operate as the map data acquiring module 11, the quadtree graph generating module 21, the Voronoi graph generating module 31, the Voronoi graph adjusting module 41, the graph synthesizing module 51, and the route finding module 61.

The map data acquiring module 11 may acquire map data (obstacle data) used for the generation of the graph. The map data acquiring module 11 can acquire the map data, for example, from an external storage device (for example, a map database server) by communication.

Figure 2:
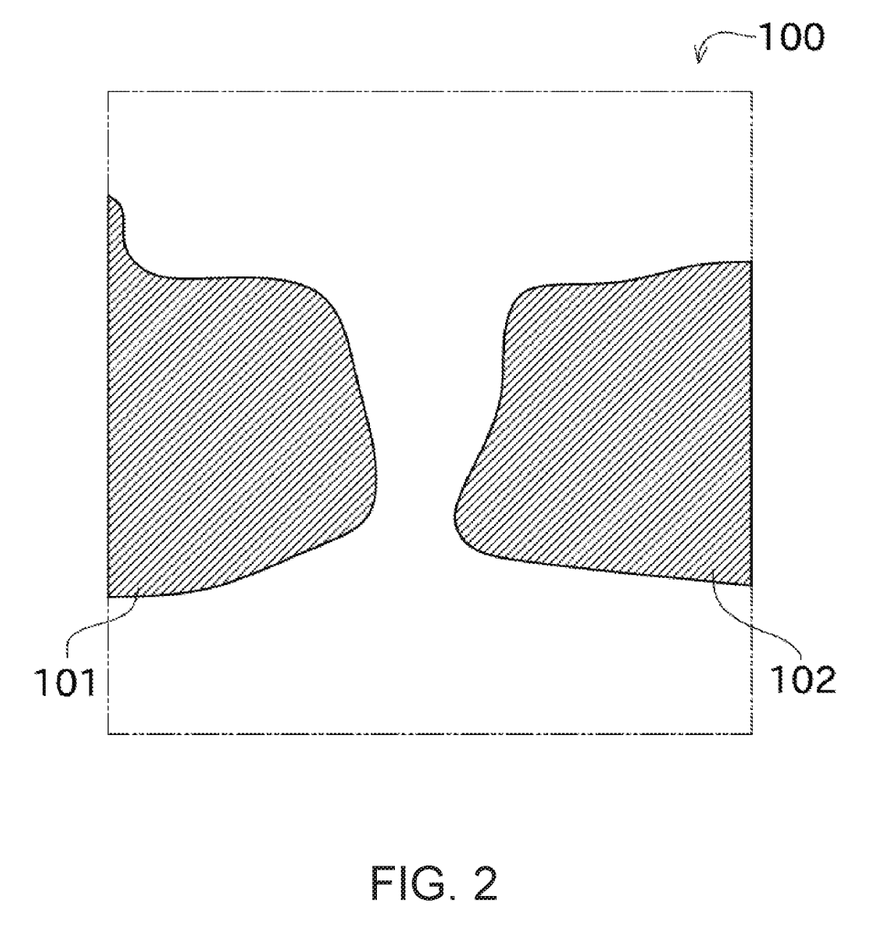
FIG. 2 is a view illustrating obstacles which exist in an area where a graph is generated.

The map data may include information on the position acid the shape of the obstacle. As illustrated in FIG. 2, for example, when obstacles 101 and 102 through which a movable body cannot pass exist in an area 100, the map data may be comprised of vector data which describes the position of each vertex of polygonal lines expressing the contours of the obstacles 101 and 102. The map data acquiring module 11 of FIG. 1 may output the acquired map data to the quadtree graph generating module 21 and the Voronoi graph generating module 31.

The quadtree graph generating module 21 may generate the graph based on the map data, while using a known quadtree dividing method (hierarchical approximate cell dividing method).

In detail, the quadtree graph generating module 21 may vertically and laterally subdivide the area 100 where a user wants to generate a route in the map data to generate four cells having equal size. If the obstacles 101 and 102 are included only in some of the generated cells, the quadtree graph generating module 21 may again subdivide the area of the cell vertically and horizontally to again generate four cells having equal size. The quadtree graph generating module 21 may recursively perform the subdividing processing until the number of subdivision reaches a given value (subdividing depth). As a result, as illustrated by chain lines in FIG. 3, the area 100 may be subdivided vertically and horizontally into a plurality of rectangular cells. There may be (first) cells filled up with the obstacle 101 or 102, (second) cells partially including the obstacle 101 or 102, and (third) cells not including the obstacle 101 or 102 at all. In the following description, the second cell may be referred to as a "partially inclusive cell," and the third cell may be referred to as an "exclusive cell."

Figure 3:
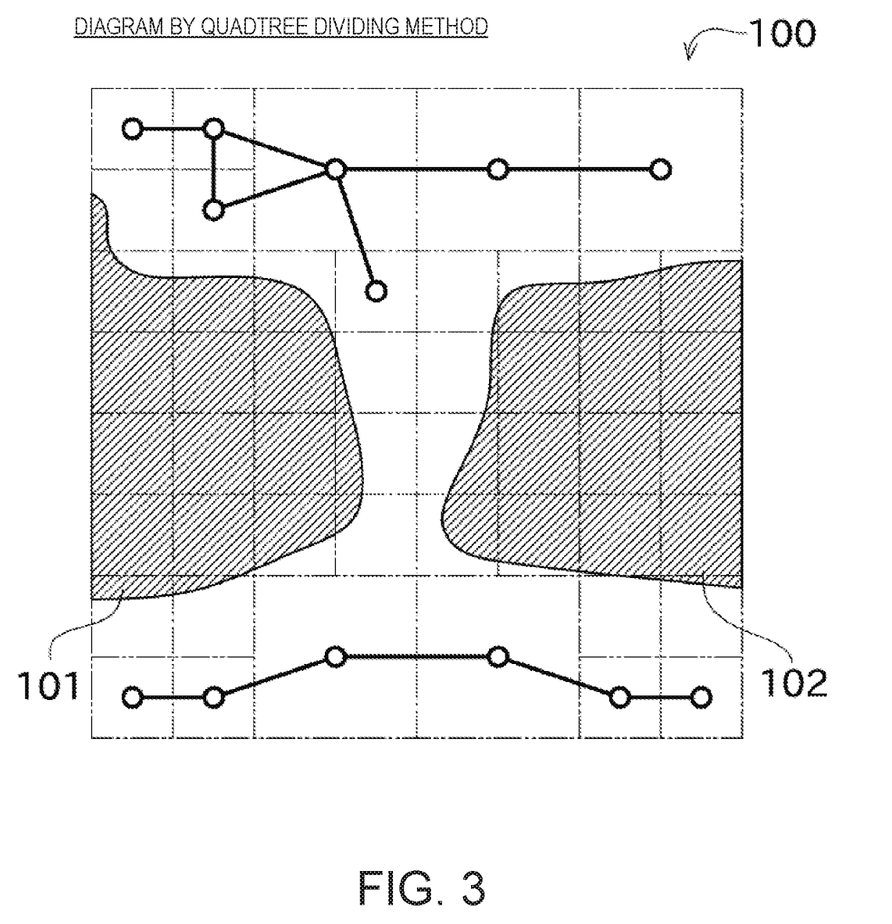
FIG. 3 is a view illustrating a generated quadtree graph.

When the subdivision of the cells is finished, the quadtree graph generating module 21 may set a vertex (first vertex) at each center of the exclusive cells, and connect the vertexes of the adjacent exclusive cells by a straight-line side (first side). Thus, the quadtree graph generating module 21 may generate the graph which can be used for a route calculation. Below, the graph according to the quadtree dividing method simply be referred to as the "quadtree graph." The quadtree graph may correspond to the first graph. FIG. 3 illustrates one example of the quadtree graph. This graph may be comprised of the first vertexes and the first sides. In FIG. 3, the first vertex is indicated by a thick-line circle, and the first side is indicated by a thick line.

The number of subdivision (a depth of subdivision) performed by the quadtree graph generating module 21 may be limited below a given number (upper limit). Therefore, if the distance between the obstacle 101 and the obstacle 102 is small (i.e., narrow), in a part between the obstacles, the subdivision may be terminated before being performed finely enough and generating an exclusive cell. As a result, the first side may not be generated.

In FIG. 3, a case where the maximum number (upper limit) of subdivisions is 3 is illustrated. In FIG. 3, since there is no exclusive cell between the obstacle 101 and the obstacle 102, no first side which connects the upper and lower graphs may exist at the center of the entire area 100. Therefore, the entire graph may be split vertically.

Although the subdivision is terminated in the state of FIG. 3, if the cells are further subdivided, the exclusive cells may be generated so as to be lined up and connect the upper and lower graphs. Therefore, the first sides can be generated in the narrow space between the obstacle 101 and the obstacle 102. However, in this case, the number of vertexes of the graph will increase tremendously.

The quadtree graph generating module 21 of FIG. 1 may output the generated graphs to the Voronoi graph adjusting module 41 and the graph synthesizing module 51.

The Voronoi graph generating module 31 may generate a graph based on the map data by using a known Voronoi dividing method.

In detail, in the general Voronoi dividing method, a plurality of points (seeds) may be given in a certain area, and when an arbitrary point in the area belongs to the nearest seed, a plane may be divided at a boundary between the point and the seed to which the point belongs. In this embodiment, the obstacles 101 and 102 may be not points but spread areas. Therefore, the Voronoi graph generating module 31 may express the contours of the obstacles 101 and 102 as polygons, determine, in the area 100, which area (surrounding area) surrounding each of the obstacles 101 and 102 an arbitrary point not included in the obstacles 101 and 102 belongs, and determine boundaries of the obtained surrounding areas.

Figure 4:
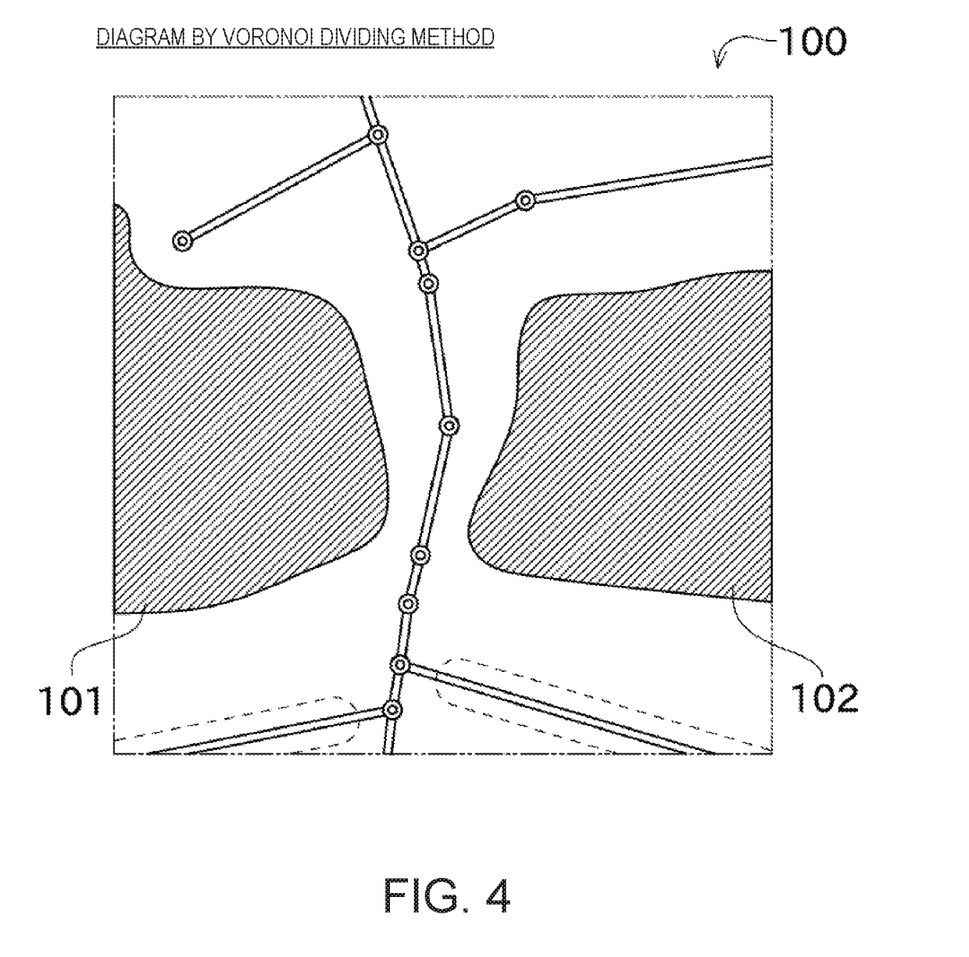
FIG. 4 is a view illustrating a generated Voronoi graph.

This boundary can be acquired in the form of a polygonal line, as illustrated in FIG. 4, for example, by obtaining straight lines which bisect an area between the polygonal line of one obstacle 101 and the polygonal line corresponding to the other obstacle 102.

The Voronoi graph generating module 31 may arrange a second vertex at the same position as each vertex of the bordering polygonal lines, and connect by second sides the second vertexes which are in relation of being connected by the polygonal lines (boundary). Thus, the Voronoi graph generating module 31 may generate the graph (second graph) which can be used for the route calculation. Below, the graph generated by the Voronoi dividing method may simply be referred to as a "Voronoi graph." The Voronoi graph may correspond to the second graph. The example of the Voronoi graph is illustrated in FIG. 4. This graph may be comprised of the second vertexes and the second sides. In FIG. 4, the second vertex is illustrated by a double circle and the second side is illustrated by a double line.

Since the Voronoi graph generating module 31 uses the Voronoi dividing method, it can easily generate the graph in the narrow place. In the example of the Voronoi graph of FIG. 4, it can be seen that the graph passing through between the obstacles 101 and 102 is generated also in the narrow part between the obstacles 101 and 102 where the graphs are disconnected in the quadtree graph of FIG. 3 due to the termination of the division.

Note that, according to the Voronoi dividing method, the second vertexes and the second sides can be arranged so that the space between the obstacles is equally divided or bisected even when the obstacles are widely separated from each other. Therefore, for example, as illustrated by broken lines in FIG. 4, since a distance between the second vertex or the second side and the obstacles 101 or 102 becomes unnecessarily large, the route may become a detour or longer.

The Voronoi graph generating module 31 of FIG. 1 may output the generated graph to the Voronoi graph adjusting module 41.

The Voronoi graph adjusting module 41 may adjust the Voronoi graph generated by the Voronoi graph generating module 31 using the graph generated by the quadtree graph generating module 21.

The processing performed by the Voronoi graph adjusting module 41 may include deletion of the second side of the Voronoi graph. This side deletion processing may be to delete the second side if this second side passes only through one or more of the exclusive cell. Note that, as described above, the exclusive cell may be a cell which does not include any obstacles, where the thick-line circle (the first vertex of the quadtree graph) is disposed in FIG. 5. This processing may be performed for each of the second sides which constitute the Voronoi graph.

Figure 5:
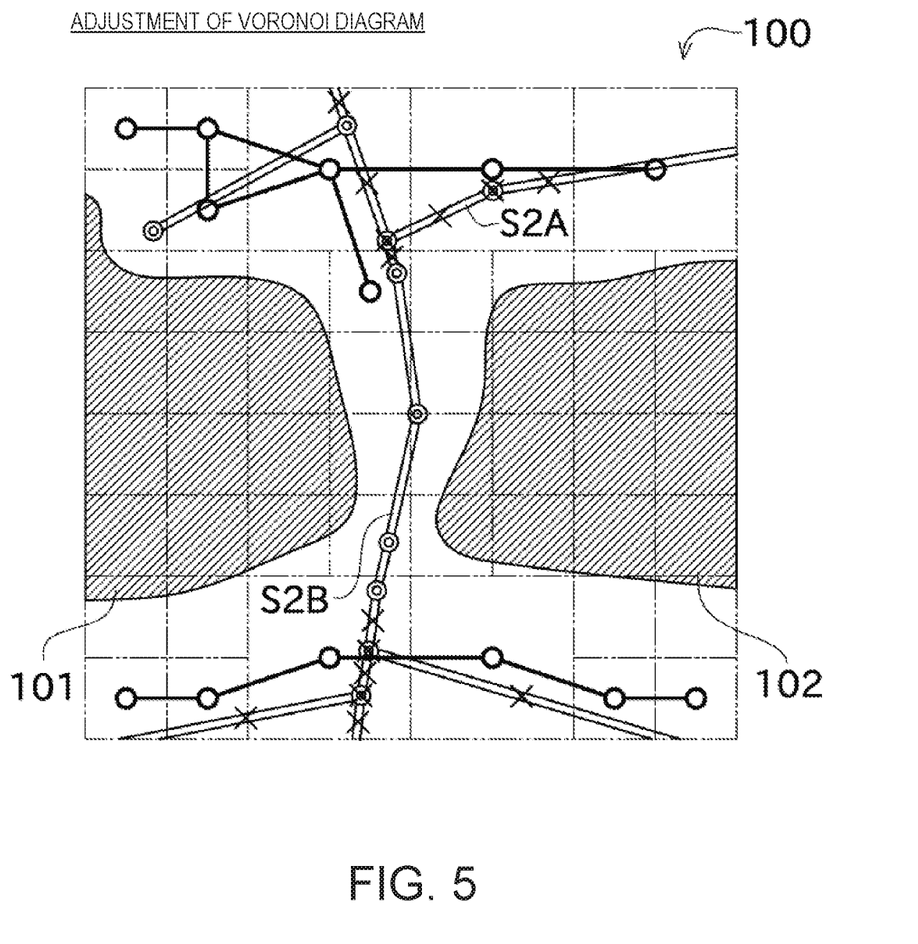
FIG. 5 is a view illustrating adjustment processing of the Voronoi graph.

For example, in FIG. 5, although the second side illustrated by a reference character S2A passes through two cells, since the two cells are both exclusive cells, this second side S2A may be subject to the deletion. In FIG. 5, an X-mark is indicated on the second side to be deleted by this processing. The Voronoi graph adjusting module 41 may also delete the second vertex which is disconnected from other second vertexes by deleting the second side. In FIG. 5, an X-mark is also indicated on the second vertex to be deleted.

As a result, for the part where the quadtree graph and the Voronoi graph substantially overlap with each other, the quadtree graph will appear in a synthesized graph which will be described below. Thus, by giving priority to the quadtree graph, the disadvantage of the Voronoi graph which tends to be a longer route can be avoided.

For example, as illustrated by a reference character S2B in FIG. 5, the second side may pass only through one or more partially inclusive cells. Since this second side S2B does not satisfy the condition described above, it may not be deleted by the Voronoi graph adjusting module 41. The second side S2B may remain still in the graph outputted from the Voronoi graph adjusting module 41. Therefore, the advantage of the Voronoi dividing method which can generate the graph in the narrow space between the obstacles 101 and 102 can favorably be utilized.

Therefore, the Voronoi graph adjusting module 41 of FIG. 1 can generate the Voronoi graph from which the second sides and the second vertexes are deleted so that the graph does not substantially overlap with the quadtree graph generated by the quadtree graph generating module 21. The Voronoi graph adjusting module 41 may output the Voronoi graph after the above adjustment to the graph synthesizing module 51.

The graph synthesizing module 51 may generate a sole synthesized graph by combining the quadtree graph outputted from the quadtree graph generating module 21, and the Voronoi graph outputted from the Voronoi graph adjusting module 41.

Specifically, the graph synthesizing module 51 may reconnect the second side of the Voronoi graph. This reconnection processing may be to reconnect the second side to the first vertex of the exclusive cell and to the second vertex, when this second vertex in question (target second vertex) is located in the partially inclusive cell and the second side passes not only through the partially inclusive cell but also through the exclusive cell. This processing may be performed for all the second side illustrated in FIG. 6.

Figure 6:
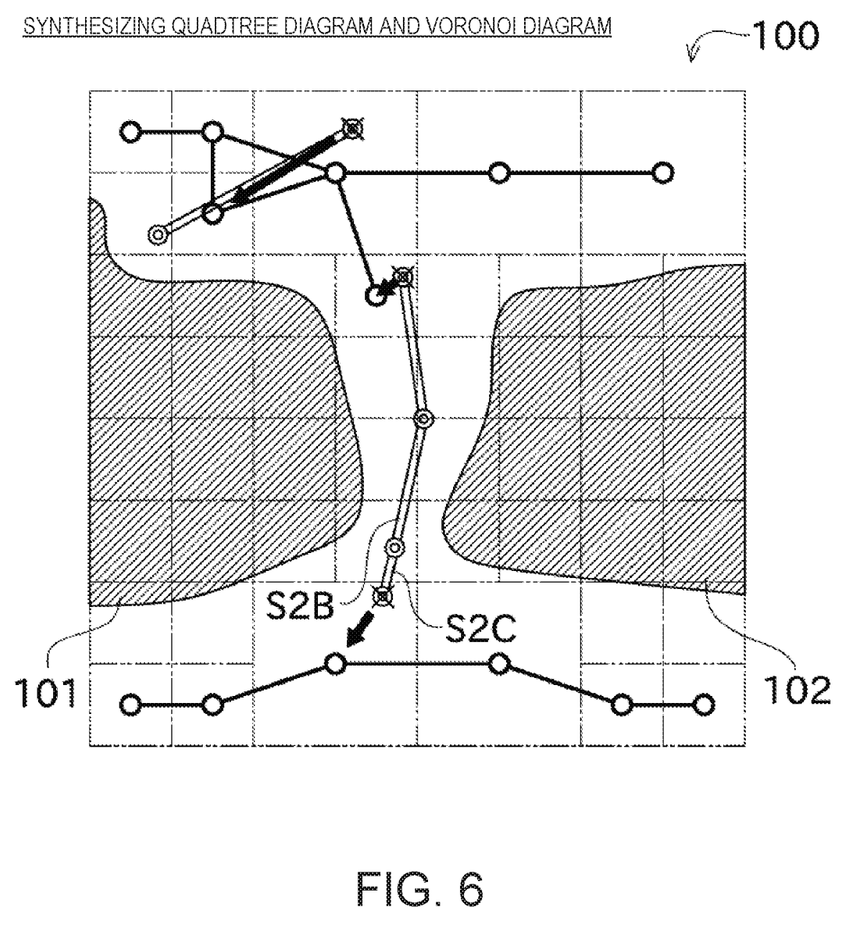
FIG. 6 is a view illustrating synthesis processing of the quadtree graph and the Voronoi graph.

For example, the second side indicated by a reference character S2C in FIG. 6 is considered. If the upper second vertex of the two second vertexes connected with each other through the second side S2C is assumed to be the target second vertex, this target second vertex may be located in the partially inclusive cell. Moreover, this second side S2C may pass not only through the partially inclusive cell but also through the exclusive cell below the partially inclusive cell. Therefore, the graph synthesizing module 51 may reconnect the second side S2C to the upper target second vertex, and to the first vertex of the exclusive cell (in detail, the exclusive cell through which the second side S2C first passes, when the second side S2C originates from the target second vertex). In FIG. 5, the reconnection of the second side is indicated by a black arrow. The graph synthesizing module 51 may delete the second vertex which is connected with no vertex. In FIG. 6, an X-mark is indicated on the second vertex to be deleted.

Figure 7:
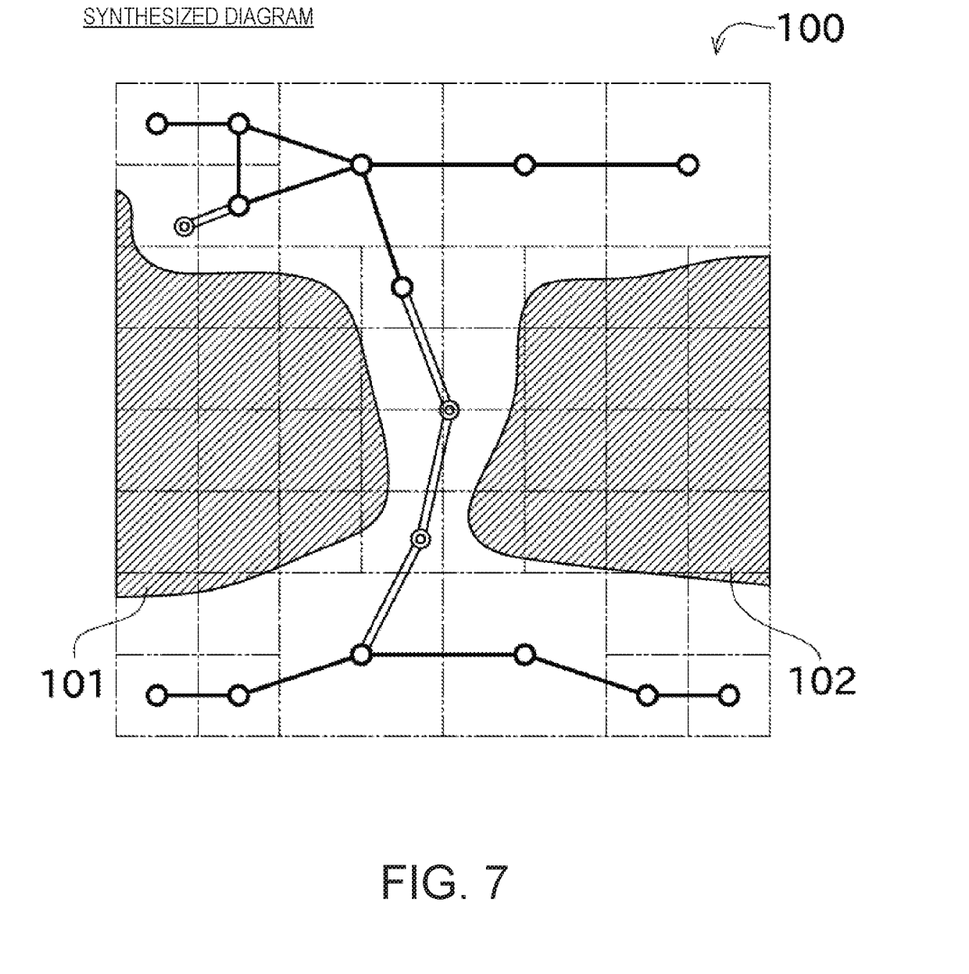
FIG. 7 is a view illustrating a graph generated as a result of the synthesis processing of the quadtree graph and the Voronoi graph.

As described using FIG. 5, the Voronoi graph generated by the Voronoi graph generating module 31 may be adjusted beforehand by the Voronoi graph adjusting module 41. By this pre-adjustment processing and the reconnection processing described using FIG. 6, the graph synthesizing module 51 can generate the graph, as illustrated in FIG. 7, in which the quadtree graph and the Voronoi graph are naturally connected without giving the user uncomfortableness.

Each first side which constitutes the quadtree graph, and each second side Which constitutes the Voronoi graph may include information related to weights (weighted graph). As one example of the weight includes, but not limited to, a value related to a traveling distance between the vertexes, a time required for the travel. In such a case, the graph as the result of connecting the quadtree graph and the Voronoi graph by the graph synthesizing module 51 may also become the weighted graph. The graph synthesizing module 51 may output the generated graph to the route finding module 61.

The route finding module 61 may search the route for the graph generated by the graph synthesizing module 51 based on a known graph search algorithm. By, for example, giving a departing location and a destination location to the obtained graph, the route finding module 61 can acquire the shortest route from the departing location to the destination location by using the shortest route problem algorithm for the weighted graph. The acquired route can be displayed, for example, on a display unit provided to the graph generating device 1, or an external display unit electrically connected to the graph generating device 1.

As described above, the graph generating device 1 of this embodiment may include the map data acquiring module 11, the quadtree graph generating module 21, the Voronoi graph generating module 31, and the graph synthesizing module 51. The map data acquiring module 11 may acquire the obstacle data including the information on the obstacles 101 and 102. The quadtree graph generating module 21 may recursively subdivide the area 100 including the obstacles 101 and 102 into the cells by the quadtree dividing method, set the first vertex in the exclusive cells, and connect the first vertexes of the adjacent exclusive cells by the first side, to generate the quadtree graph. Meanwhile, the Voronoi graph generating module 31 may set the second vertex by a different method (Voronoi dividing method) from the quadtree dividing method, and connect the second vertexes by the second side, to generate the Voronoi graph. The graph synthesizing module 51 may synthesize the quadtree graph and the Voronoi graph, to generate the synthesized graph.

Therefore, the route graph can be generated, which takes both the advantage of the quadtree dividing method, and the advantage of another method.

Although the suitable embodiment of the present disclosure is described above, the above configuration may be changed as follows.

The graph generating device 1 may be provided with a potential graph generating module which generates the graph by using the concept of a known potential approach, instead of the Voronoi graph generating module 31. For example, the potential graph generating module (second graph generating module) may generate a potential field of which the potential becomes higher as it is closer to the obstacle 101 or 102, sets a point where the potential becomes a local minimum, as the second vertex, and suitably connects the second vertexes by the second side, to generate the graph.

The maximum number of subdivisions in the quadtree dividing method may be suitably set, for example, in consideration of the arrangement of the obstacles 101 and 102 in the map data, the physical size of the movable body, etc.

The Voronoi dividing method may also be configured to divide, not at the boundary where the space between the obstacles 101 and 102 is equally divided but also at a boundary where the space is divided at an eccentric dividing ratio of 1:2. Such a boundary can be obtained by a calculation accompanied by a known weighted processing.

The boundary acquired by the Voronoi dividing method may not be limited to the polygonal line but may be, for example, a smooth curve. In this case, the Voronoi graph generating module 31 may set a plurality of second vertexes along the curve, and connect the second vertexes by the second sides to generate the Voronoi graph.

The route finding module 61 may be provided to a computer (route finding computer) different from the graph generating device 1. In this case, the graph generating device 1 may store the graph generated in the graph synthesizing module 51 in a suitable storage device (for example, a database server or a removable memory). The route finding computer may acquire the graph from the storage device and perform the route finding.

The graph generating device 1 may be used for generating the graph which is generated for searching the passing route of the movable body, such as a ship, for example. Note that the present disclosure may be applied to ships which typically travel on water or sea which are referred to as surface ships, and may also be applied to other types of ships including boats, dinghies, watercrafts, and vessels. Further, the present disclosure may also be applied, if applicable, to submarines, aircrafts, and spaceships, as well as any types of vehicles which travel on the ground, such as automobiles, motorcycles, and ATVs.

TERMINOLOGY

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionally involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of Which are to be understood as being among other acceptable examples. All such modifications and variations are intended to be included herein within the scope of this disclosure and protected by the following claims.

What is claimed is:

1. A device for generating a graph and identifying a route on a map to avoid one or more obstacles on the map through which a ship cannot pass, the map including information about a position and a shape of each obstacle, comprising:
processing circuitry configured:
to acquire obstacle data including information on a position and a shape of an obstacle from the map,
to acquire a departing location and a destination location,
to generate a first graph having an area including the obstacle that is recursively divided with a quadtree splitting method into exclusive cells, each exclusive cell being exclusive of the obstacle, the first graph having a first vertex set in each exclusive cell and a first line interconnecting adjacent first vertexes,
to generate a second graph that includes second vertexes and a second line interconnecting the second vertexes, the second graph being generated by a different method from the quadtree splitting method,
to generate a combined graph from the first graph and the second graph,
to acquire a shortest route between the acquired departing location and destination location based on the combined graph, and
to display the acquired route on a display on the ship to guide the ship from the departing location to the destination location that avoids the obstacle,
wherein the processing circuitry is further configured to adjust the second graph before being combined with the first graph by being configured:
to delete portions of the second line only passing through one or more of the exclusive cells, and
to maintain portions of the second line passing through one or more partially inclusive cells, each partially inclusive cell including a portion that includes the obstacle and a portion that excludes the obstacle.

2. The device of claim 1, wherein the processing circuitry is further configured
to terminate the recursive division once the recursive division has been performed a given upper limit number of times.

3. The device of claim 2, wherein the processing circuitry is further configured:
to determine a surrounding area of the obstacle that is located in the area, and determine where to position an arbitrary point, that is not included in the obstacle, in the surrounding area by a Voronoi dividing method,
to set a plurality of second vertexes along a boundary of the determined surrounding area, and
to generate the second graph by connecting the second vertexes with a line.

4. The device of claim 3, wherein, when a target second vertex that is one of two vertexes connected by the second line in the second graph is located in a partially inclusive cell and the second line passes through both the exclusive cell and the partially inclusive cell, the processing circuitry is further configured to connect a third line to the target second vertex and to the first vertex of the exclusive cell through which the second line first passes when the second line originates from the target second vertex.

5. A method of generating a graph and identifying a route on a map to avoid one or more obstacles on the map through which a ship cannot pass, the map including information about a position and a shape of each obstacle, comprising:
acquiring obstacle data including information on a position and a shape of an obstacle from the map;
acquiring a departing location and a destination location;
generating a first graph having an area including the obstacle that is recursively divided with a quadtree splitting method into exclusive cells, each exclusive cell being exclusive of the obstacle, the first graph having a first vertex set in each exclusive cell and a first line interconnecting adjacent first vertexes;
generating a second graph that includes second vertexes and a second line interconnecting the second vertexes, the second graph being generated by a different method from the quadtree splitting method;
generating a combined graph from the first graph and the second graph;
acquiring a shortest route between the acquired departing location and destination location based on the combined graph; and
displaying the acquired route on a display on the ship to guide the ship from the departing location to the destination location that avoids the obstacle,
wherein the method further comprises adjusting the second graph before being combined with the first graph, the adjusting including deleting portions of the second line only passing through one or more of the exclusive cells and maintaining portions of the second line passing through one or more partially inclusive cells, each partially inclusive cell including a portion that includes the obstacle and a portion that excludes the obstacle.

6. The method of claim 5, further comprising: determining a surrounding area of the obstacle that is located in the area, and determining where to position an arbitrary point, that is not included in the obstacle, in the surrounding area by a Voronoi dividing method, setting a plurality of second vertexes along a boundary of the determined surrounding area, and generating the second graph by connecting the second vertexes with the second line.

7. The method of claim 5, wherein, when a target second vertex that is one of two vertexes connected by the second line in the second graph is located in a partially inclusive cell and the second line passes through both the exclusive cell and the partially inclusive cell, the processing circuitry is further configured to connect a third line to the target second vertex and to the first vertex of the exclusive cell through which the second line first passes when the second line originates from the target second vertex.

* * * * *